United States Patent Office 2,759,756
Patented Aug. 21, 1956

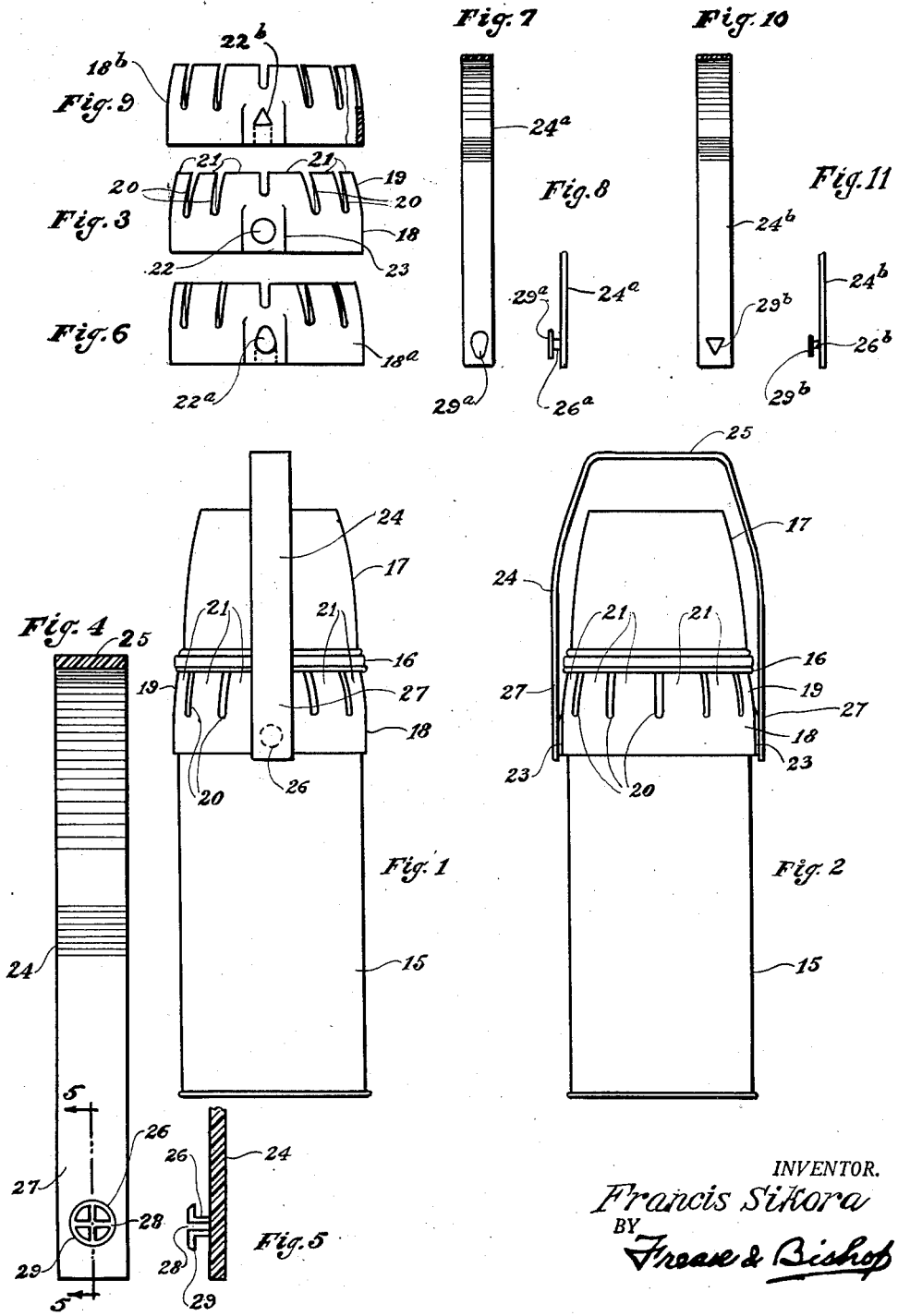

2,759,756

HANDLE FOR THERMOS BOTTLES AND THE LIKE

Francis Sikora, Canton, Ohio, assignor to Lydia Belle Sikora, Canton, Ohio

Application October 15, 1952, Serial No. 314,786

2 Claims. (Cl. 294—31.2)

The invention relates to handles or carriers for containers, and is particularly adapted for connection to a thermos or vacuum bottle.

An object of the invention is to provide a detachable handle bail to a thermos bottle or the like, so as to easily lift and carry the same.

Another object is to provide a device of this character comprising a snap ring or collar for engagement with the upper end of the bottle, and a handle bail pivotally connected to said ring.

A further object is to provide such a ring formed of a slightly flexible material such as many of the commonly used synthetic resins or other plastic materials, having inwardly disposed spring claws at its upper edge for clamping engagement with the upper end portion of the bottle.

A still further object of the invention is to provide a ring of the character referred to which is inwardly tapered or curved at its upper side and having spaced slots therein providing a plurality of inwardly disposed spring claws.

Another object is to provide such a ring with a detachable handle bail having means for preventing the handle from accidentally becoming detached from the ring.

A further object is to provide a pivotal, detachable connection between the handle bail and the ring.

The above objects together with others which will be apparent from the drawing and following description, or which may be later referred to, may be attained by constructing the improved thermos handle in the manner hereinafter described in detail and illustrated in the accompanying drawing, in which:

Fig. 1 is a side elevation of a thermos bottle showing the improved handle or carrier applied thereto, the handle bail being shown in edge elevation;

Fig. 2 a view similar to Fig. 1 taken at right angles thereto, showing the handle bail in side elevation;

Fig. 3 a detached, side elevation of the split ring to which the handle bail is detachably connected;

Fig. 4 an enlarged, vertical sectional view of the handle bail;

Fig. 5 a fragmentary, sectional view through the lower portion of one leg of the handle bail shown in Fig. 4, showing a preferred form of stud for detachably, pivotally connecting the handle bail to the ring shown in Fig. 3 and preventing accidental displacement therefrom;

Fig. 6 a side elevation of the ring with slightly modified aperture for receiivng a modified form of attaching stud upon the handle bail;

Fig. 7 a vertical, sectional view through a handle bail provided with modified form of stud for attachment to the ring shown in Fig. 6;

Fig. 8 a fragmentary, edge elevation of the lower portion of one leg of the handle bail provided with attaching stud shown in Fig. 7;

Fig. 9 a sectional, elevation of a ring with modified form of aperture for receiving a modified form of attaching stud upon the handle bail;

Fig. 10 a vertical, sectional view through a handle bail provided with modified form of attaching stud for connection to the ring shown in Fig. 9; and, Fig. 11 a fragmentary, edge elevation of the lower end portion of one leg of the handle bail provided with the modified form of stud shown in Fig. 10.

Referring now more particularly to the embodiment of the invention illustrated in the accompanying drawing, in which similar numerals refer to similar parts throughout, the handle or carrier to which the invention pertains is adapted to be detachably connected to a container, such as the conventional thermos or vacuum bottle indicated generally at 15 in Figs. 1 and 2.

As in usual practice this bottle is in the form of a substantially straight cylinder having an annular collar or shoulder 16 at its upper end portion, just below the usual threaded neck (not shown) to which the usual cap 17 is attached.

For the purpose of mounting the handle or carrier upon the bottle, a ring 18 is provided, having an inside diameter slightly larger than the diameter of the bottle 15 so that the ring may be slidably telescoped over the bottle from the lower end thereof.

This ring is formed of material having a certain amount of flexibility or spring quality, preferably a synthetic resin or other suitable plastic material. The ring 18 is tapered or curved inwardly toward the upper edge, as indicated at 19, and the cross sectional wall thickness of the ring is preferably upwardly tapered as shown in section in Fig. 9.

For the purpose of providing a plurality of spaced, spring claws at the upper edge of the ring, spaced slots or cuts 20 extend from the upper edge of the ring to a point intermediate the upper and lower edges thereof forming therebetween the inwardly and upwardly disposed spring claws 21.

At diametrically opposite points, near the lower edge of the ring, apertures 22 are formed therein, and preferably the rim is reinforced at these points as by forming outwardly extending bosses 23 thereon.

The handle bail, as indicated generally at 24, may also be formed of synthetic resin or other plastic material, or other suitable material, and is flat in cross section and as best shown in Figs. 1 and 2 is so shaped and proportioned that when pivotally connected to the ring 18 it may swing over the top of the thermos bottle and cap, the straight top portion 25 thereof being spaced sufficiently above the top of the cap to permit the fingers of one hand to be received therebeneath in order to pick up and carry the thermos bottle by means of the handle bail.

For the purpose of pivotally connecting the handle bail to the ring 18, a headed stud 26 is formed on the inner side of each depending leg 27 of the handle bail, near the lower end thereof, as best shown in Figs. 4 and 5.

As shown in these two figures the stud 26 may be split, as indicated at 28, so as to make the same somewhat flexible, and the bevelled head 29 thereof is of slightly larger diameter than the apertures 22 in the ring.

Thus, by pressing the bevelled head 29 of the stud into the aperture 22 the stud will be flexed or compressed sufficiently to permit the head 29 thereof to pass through the aperture 22 and spring back to normal position upon the inside of the ring 18 holding the handle bail pivotally connected to the ring and preventing accidental detachment of the handle bail from the ring.

In order to remove the handle bail from the ring, the split sections of the head 29 of the stud must be manually squeezed together or compressed to permit the stud to pass outwardly through the aperture 22.

In Figs. 6, 7 and 8 a modified form of split ring and handle bail therefor are shown. The ring 18a may be generally of the construction and arrangement of the ring 18, with the exception that the apertures 22a in diametrically opposite sides of the ring are of pear shape.

The handle bail 24a is of the same general construction as the handle bail 24 with the exception that the studs 26a thereon are provided with inverted pear shape heads 29a, of a size and shape to permit the same to be passed through the apertures 22a in the ring, when the handle bail is reversed or located upside down.

In order to attach the handle bail 24a to the ring 18a, the handle bail is inverted, from the position shown in Figs. 7 and 8, and the pear shaped heads 29a of the studs 26a are inserted through the pear shaped apertures 22a in the ring, the handle bail being then pivotally swung to upright position, so that the larger ends of the heads 29a are at the top, as shown in Fig. 7, adjacent to the smaller, upper ends of the apertures 22a, thus preventing the handle bail from becoming accidentally detached from the ring 18a.

In order to remove the handle bail from the ring, the handle bail must be swung downward, so that the pear shaped heads 29a of the studs thereon will register with the pear shaped openings 22a in the ring, permitting the studs to be withdrawn from the ring.

In Figs. 9, 10 and 11 is shown another slight modification of ring and handle bail. In this form of the invention the ring 18b is of substantially the same construction and shape as the rings 18 and 18a, with the exception that the diametrically opposite apertures 22b therein are triangular.

The handle bail 24b is substantially the same as the handle bails 24 and 24a, with the exception that the heads 29b upon the studs 26b are triangular and inverted as compared with the triangular apertures 22b in the ring.

This handle bail may be attached to or removed from the ring in the same manner as described in detail regarding the handle bail 24a and ring 18a.

The reason for providing means for detachably connecting the handle bail to the ring is to permit the device to be shipped in knock-down form in considerably less space than would be required in the packing and shipping of the assembled rings and handle bails. The detached rings may be more or less nested, and the detached handle bails may be similarly nested, so as to be packed in considerably less space.

From the above it will be obvious that a simple, inexpensive and efficient handle or carrier is provided for thermos bottles and the like, which may be quickly and easily attached to or detached from a thermos bottle, and which when in use provides a satisfactory means for picking up and carrying a thermos bottle.

In the foregoing description, certain terms have been used for brevity, clearness and undertsanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A carrier for a bottle having a shoulder at its upper end, said carrier comprising a detachable continuous ring of spring-like plastic material of slightly greater inside diameter than the bottle and adapted to be telescoped over the bottle, said ring being upwardly and inwardly curved and being decreased in cross-sectional thickness toward its upper edge, there being spaced slots extending downward through the upper edge of the ring providing upwardly and inwardly curved tapered spring jaws for engagement with the shoulder upon the bottle, and a handle bail pivotally attached to diametrically opposite points on the ring for supporting the bottle suspended in said ring.

2. As an article of manufacture, a carrier for a bottle having a shoulder at its upper end, said carrier comprising a detachable continuous one-piece ring of spring-like synthetic resin plastic material of slightly greater inside diameter than the bottle and adapted to be telescoped over the bottle, said ring being upwardly and inwardly curved and the wall thickness thereof being decreased in cross-section toward its upper edge, there being spaced slots extending downward through the upper edge of the ring providing upwardly and inwardly curved tapered spring jaws for engagement with the shoulder upon the bottle, diametrically opposite integral bosses formed upon the outer periphery of the ring below said spring jaws, a handle bail of generally inverted U-shape and integral attaching means upon the end portions of the handle bail cooperating with said bosses for detachably pivotally attaching the handle bail to the ring for supporting a bottle suspended in said ring.

References Cited in the file of this patent

UNITED STATES PATENTS

| Number | Name | Date |
|---|---|---|
| 260,470 | Fisher | July 4, 1882 |
| 1,074,907 | Spengler | Oct. 7, 1913 |
| 1,360,056 | Tiner | Nov. 23, 1920 |
| 1,702,199 | Cunningham | Feb. 12, 1929 |
| 1,711,536 | Levien | May 7, 1929 |
| 1,904,122 | Chapman | Apr. 18, 1933 |
| 1,977,365 | Wolcott | Oct. 16, 1934 |
| 1,982,276 | West | Nov. 27, 1934 |
| 2,492,464 | Coyle et al. | Dec. 27, 1949 |
| 2,627,359 | Woodward | Feb. 3, 1953 |